UNITED STATES PATENT OFFICE.

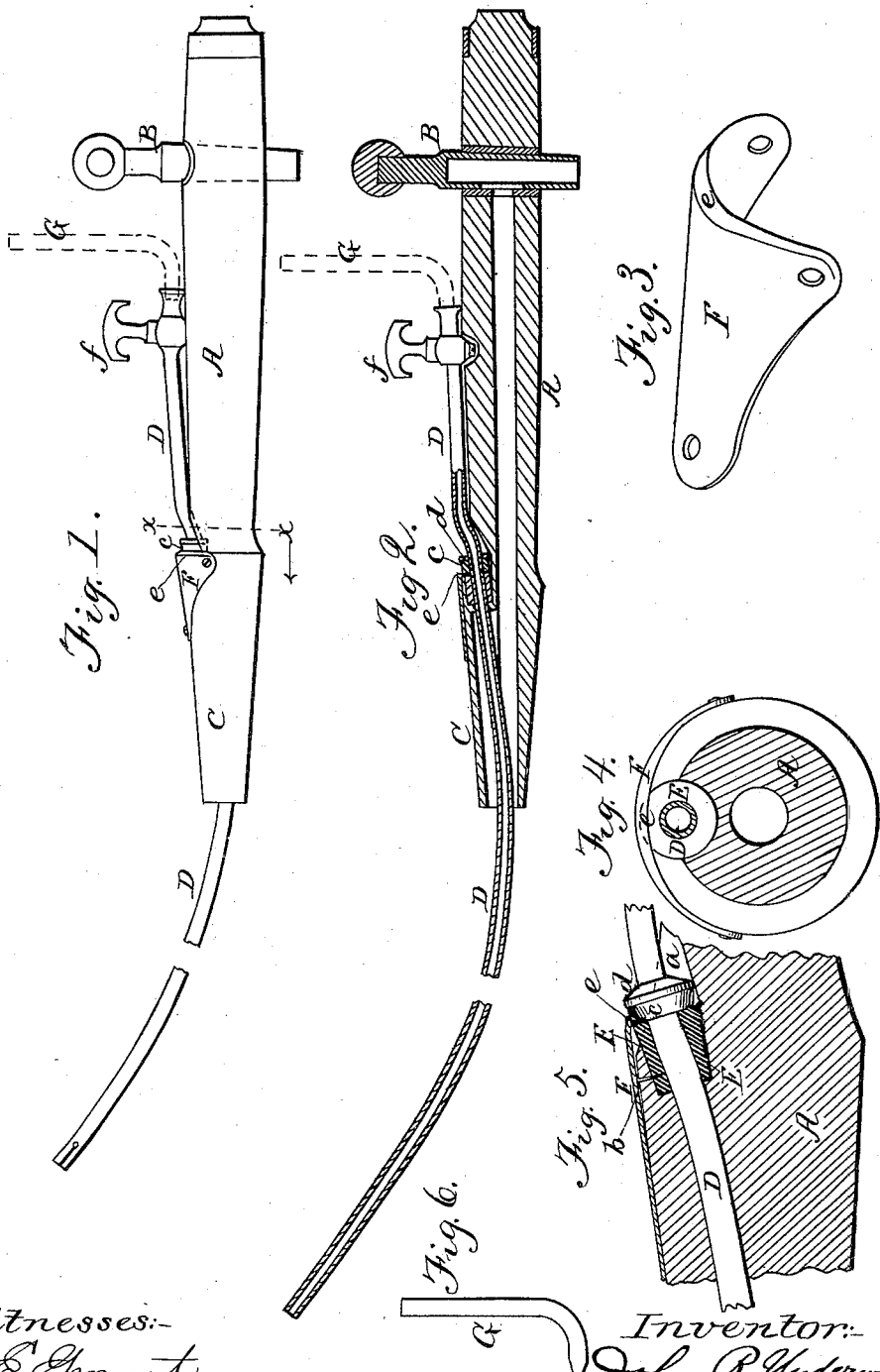

JOHN R. UNDERWOOD, OF COLUMBUS, OHIO, ASSIGNOR OF ONE-HALF TO ISAAC N. HANSBROUGH AND WILLIAM H. MUELLER, BOTH OF SAME PLACE.

FAUCET.

SPECIFICATION forming part of Letters Patent No. 344,695, dated June 29, 1886.

Application filed March 4, 1886. Serial No. 194,060. (No model.)

*To all whom it may concern:*

Be it known that I, JOHN R. UNDERWOOD, a citizen of the United States, residing at Columbus, in the county of Franklin and State of Ohio, have invented new and useful Improvements in Faucets, of which the following is a specification.

The improvements herein relate to faucets for drawing of beer, ale, and similar fermented beverages without permitting the escape of the carbonic-acid gas from the keg or barrel—that is to say, in those classes of faucets provided with a tube which is pushed in after the faucet is driven home, so as to rise above the level of the contents, and which tube allows fresh air to flow into the barrel when the cock is opened, and at the same time prevents the escape of gas.

The objects of my said improvement are to simplify the construction of such faucets and to render a wooden faucet capable of adaptation to the above-described class of beer-faucets, which, as a rule, are so made and of such costly material as to be a considerable tax upon the retailer of fermented beverages.

In the accompanying drawings, Figure 1 represents my improved beer-faucet in elevation. Fig. 2 is a longitudinal section of the same. Fig. 3 is a perspective view of the holding-plate for the rubber packing-plug of the air-tube. Fig. 4 shows a cross-section on the line $x\ x$ of Fig. 1, enlarged. Fig. 5 shows a detail sectional view of the packing rubber plug of the air-tube, and Fig. 6 shows the blow-pipe.

The faucet is made of wood, and A is the barrel, which has the usual plug-cock, B, and tapering insertion portion C, as ordinarily made in wooden faucets.

The tight joint of the sliding air tube or duct D in my improvement is made by boring into the shoulder, or at that portion where the taper of the inserting part C joins the body A, a large enough opening, as in Fig. 5, to receive a rubber tubing-plug, E, which is tightly seated in said bored recess $a$, and secured by tacks $b$, so that it projects out from said bored recess, for a purpose which I shall presently state. The air tube or duct D is passed into the barrel after the usage now so well known; but the said duct has a rubber gasket, $c$, supported by a collar, $d$, on the tube at the turn of its curve forward, which abuts against the projecting end of the rubber tubular plug E, so as to form a tight joint. For the better securement of the said rubber plug in its bearing against the shoulder of the bore $a$, as above described, I fasten to taper C upon the top a cap-holding plate, F, of the form shown in Fig. 3, or of any suitable form, which plate, by its front overlapping edge, $e$, holds the rubber plug-tubing E from being drawn out of its socket in the act of withdrawing the air-tube, the pins $b$ also aiding to hold the rubber plug in place. The edge $e$ of the cap-plate F is bent down over the top part of the projecting end of the rubber plug, and thus holds the latter in place, as shown in Figs. 4 and 5.

In using the faucet the air-tube is to be pushed in until the rubber stop or gasket $c$ comes tightly up to the rubber packing-plug E in the faucet, the small stop-cock $f$ being closed until such time as there is not pressure enough to cause the beer to flow, when, in that event, the cock $f$ may be opened and allowed to remain open until sufficient air has been forced in by atmospheric pressure to cause the beer to run freely. Now, should the air-pipe D from any cause fail to work, the bent blow-pipe G may be inserted in the stop-cock end of the air-tube, when, by blowing down into said tube D, any obstruction that may have gained lodgment may be removed. The rubber plug can neither be pushed inward nor drawn out by the air-tube, and with the tube-gasket $c$ forms an air-tight joint, while also preventing leakage at the point.

I claim—

1. The combination, with the faucet having the tubular rubber plug seated in a recess therein, of the air-tube having a rubber gasket seated upon a collar of said air-tube, as shown, and for the purpose specified.

2. The combination, with the faucet having the tubular rubber plug seated in a recess therein, and a cap-plate overlapping the outer end of said rubber plug, of the air-tube having the rubber gasket, and the collar $d$, as shown and described.

3. The air-tube having a stop-cock, a rubber gasket, and a supporting-collar for the latter, combined with the faucet-body having the tubular rubber plug, as shown and described.

In testimony whereof I have hereunto set my hand in the presence of two subscribing witnesses.

JOHN R. UNDERWOOD.

Witnesses:
J. F. LINTON,
JOHN J. LENTZ.